April 13, 1965  G. D. PIANA  3,177,798
COFFEE MAKER
Filed May 20, 1963

INVENTOR.
GUIDO DELLA PIANA
BY Robert Shaw 3,177,798
COFFEE MAKER
Guido Della Piana, Malden, Mass., assignor of one-half to Antonio D. Fermano, Malden, Mass.
Filed May 20, 1963, Ser. No. 281,694
5 Claims. (Cl. 99—287)

The present invention relates to a coffee maker and, more particularly, to a coffee maker wherein water is directed under pressure into coffee grounds to effect removal therefrom of the materials which, together with the water, constitute the coffee beverage.

In a coffee maker of the general type here involved, the coffee beverage is prepared by delivering hot water over grounds in a coffee basket. The water percolates through the coffee grounds to remove the essence therefrom by a combination of dissolving and extracting. It is desirable that the water and grounds in the basket be in a state of agitation so that the particles of ground coffee will be washed continuously by a fluid containing a low concentration of dissolved solubles. Further, such agitation speeds removal of other particles by extraction or erosion. However, in a conventional percolator the water is delivered upon the coffee grounds in droplets from above, passing therethrough by the action of gravity. The droplets have a tendency to pack the grounds rather than effect agitation thereof. In addition, the water forms paths through the grounds and subsequently follows these paths, which results in some coffee particles having little contact with the water. Consequently, brewing coffee in such a maker is relatively slow, and it is difficult to obtain maximum usage of the coffee grounds; something less than thirty percent of the materials that contribute taste and body to the coffee beverage is extracted from the grounds.

An object of the present invention is to provide a coffee maker in which the coffee beverage is brewed more rapidly than in conventional coffee makers and in which more complete removal of the essence from coffee grounds is effected.

Another object is to provide a coffee maker in which water is directed or sprayed under pressure into coffee grounds to maintain the said grounds and water in a state of agitation during the brewing process.

Other objects will be evident in the description to follow and will be particularly pointed out in the appended claims.

Generally and by way of summary, the objects of the invention are attained in a coffee maker comprising, in combination, a container; a tube member open at each end substantially vertically disposed within the container; a coffee grounds basket supported by the tube member between the said open ends; and a flow-directing member having a body portion with a cavity extending inward from a region of the surface thereof and an aperture extending outward from the cavity to another region of the surface, the top open end of the tube member being disposed within the cavity.

The invention will be described in connection with the accompanying drawing in which FIG. 1 is a sectional elevation view of a coffee maker embodying a flow-directing member of the present invention;

Figure 1:
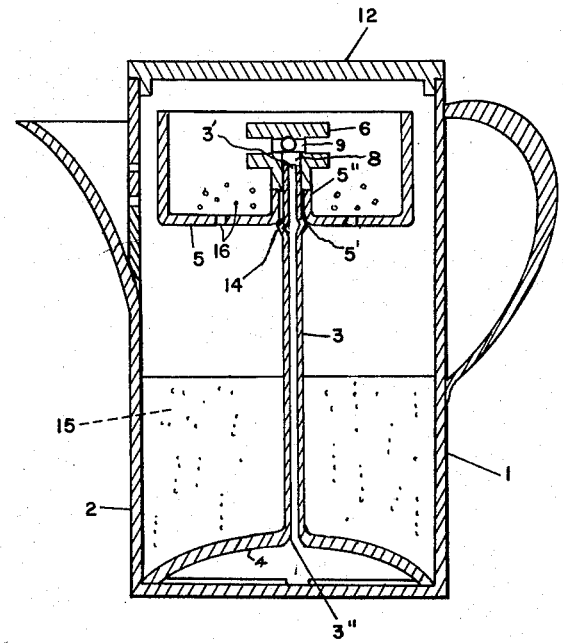
Figure 2:
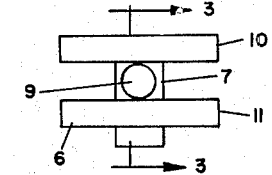
FIG. 2 is an enlarged elevation view of the flow-directing member.
Figure 3:
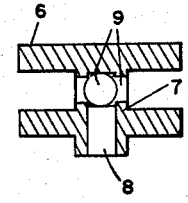
FIG. 3 is a section view taken upon the line 3—3 in FIG. 2.

Referring now to FIG. 1, a coffee maker is shown at 1 comprising a container 2 to hold a fluid, shown in phantom at 15. Except for the modification hereinafter described, the coffee maker may be of a conventional percolator type. A tube member 3 open at its top and bottom ends 3' and 3", respectively, is substantially vertically disposed within the container 2, being supported by an inverted saucer-shaped support 4 integral with the tube member 3. The fluid in the lower part of the container 2, upon the application of heat to the container, is delivered upward within the tube toward the open top end 3'. Unlike the conventional percolator, however, wherein the fluid flows from the top end 3' and filters by gravity feed through the coffee grounds in a coffee grounds basket 5, the present invention contemplates directing the fluid substantially horizontally into the coffee grounds with some force. Consequently, the coffee grounds and fluid in th basket are maintained in a state of agitation during the brewing process. In this manner, intimate contact between all the grounds and the fluid is effected and the grounds are washed by that portion of the fluid containing a low concentration of solubles. In addition, the continuous movement of the turbulent mixture keeps drain perforations 16 of the basket 5 free for fluid flow therethrough, thus preventing boiling over the said basket. It is now in order to describe in greater detail, with reference particularly to FIGS. 2 and 3, the flow-directing member, shown at 6, which effects these novel results.

The flow-directing member 6 shown comprises a vertically disposed substantially cylindrical body portion 7 having a substantially cylindrically-shaped cavity 8 extending axially inward from the bottom of the member. A plurality of angularly displaced radial apertures or openings 9 extend horizontally outward from the cavity 8 to the side surface of the flow-directing member 6. The open top end 3' of the tube member 3, as shown in FIG. 1, is disposed within the cavity 8 to deliver the fluid from the said top end, the fluid thereby being directed, when the coffee maker is in use, substantially horizontally and with appreciable force into the coffee grounds in the basket 5. The basket 5 contains an aperture 5' to receive the tube 3 and an upwardly extending sleeve 5" serves to support the flow-directing member 6 within the basket 5, preferably slightly above the coffee grounds. The basket 5 is supported upon a shoulder 14 formed by enlarging the cross dimensions of the tube 3.

The fluid flow member 6 may have an upper flange 10 integral with the top of the body portion 7 and a further integral flange 11 displaced axially downward from the upper flange 10. The openings 9 are disposed between the upper and lower flanges. The flanges thereby prevent the fluid from flowing upward or downward to maintain the substantially horizontal flow.

Since the flow-directing member 6 thus deflects the fluid, the coffee maker cover, shown at 12, does not require the conventional glass member. The fluid may, for the reasons before discussed, be boiled up through the tube 3 more rapidly than in the conventional percolator with little chance of boiling over. It is possible, therefore, to brew coffee much faster than by using a conventional coffee maker, and, furthermore, directing the fluid under pressure into the grounds extracts the essence more completely therefrom, as before mentioned, thus reducing the amount of coffee grounds needed.

Modification of the invention will occur to those skilled in the art and all such modifications are considered to be within the spirit and scope of the present invention as defined in the appended claims.

What is claimed is:

1. Apparatus of the character described comprising, in combination, a container to hold a fluid, a tube member open at each end substantially vertically disposed wholly within the container and operable to receive the fluid and deliver it upward to discharge the same from the open top end thereof, a coffee-grounds basket removably supported by the tube member between the said open ends, and a flow-directing member having a body portion with a cavity extending inward from the lower surface thereof and a radial aperture extending outward from the cavity, the open top end of the tube member being disposed within the cavity to enable the delivery of the fluid thereto, and spaced radial flanges above and below said radial apertures, whereby to direct flow to be sprayed substantially horizontally into the basket through the aperture the flow-directing member being disposed wholly within the basket.

2. Apparatus as claimed in claim 1 and in which the flow-directing member is supported by an upwardly extending sleeve of the basket.

3. Apparatus of the character described comprising, in combination, a container, a tube member open at each end substantially vertically disposed within the container, a coffee-grounds basket supported by the tube member between the said open ends, and a flow-directing member having a body portion with a cavity extending inward from a region of the surface thereof and an aperture extending outward from the cavity to another region of the surface, the top open end of the tube member being disposed within the cavity, the flow-directing member being disposed wholly within the basket and being supported by a sleeve which extends upward from the bottom of the basket.

4. Apparatus as claimed in claim 3 and in which the flow-directing member comprises a substantially cylindrical body portion having a substantially cylindrical-shaped cavity extending vertically inward from the bottom of the member, an upper flange integral with the top of the body portion, a further integral flange displaced axially downward from the upper flange and a plurality of angularly displaced radial openings extending horizontally outward from the cavity to the side surface of the member, the said openings being disposed between the upper flange and the further flange.

5. Apparatus as claimed in claim 4 and in which four radial openings are provided angularly displaced substantially 90°.

References Cited by the Examiner
UNITED STATES PATENTS

| 608,540 | 8/98 | Beler. |
| 739,143 | 9/03 | Berge. |

FOREIGN PATENTS

| 7,538 | 6/86 | Great Britain. |
| 539,795 | 6/22 | France. |

ROBERT E. PULFERY, *Primary Examiner.*

WILLIAM B. PENN, JOSEPH D. BEIN, *Examiners.*